//
Patented Mar. 7, 1950

2,499,503

UNITED STATES PATENT OFFICE 2,499,503

ALKALI-METAL PENTAALKYL TRIPOLY-PHOSPHATES AS STABILIZERS FOR VINYL RESINS

Curtis E. Huff and Gilbert A. Zimmerman, Mishawaka, Ind., assignors to United States Rubber Company, New York, N. Y., a corporation of New Jersey No Drawing. Application October 29, 1946, Serial No. 706,512

8 Claims. (Cl. 260—31.8)

This invention relates to improvements in the stabilization of polyvinyl resin compositions.

It is customary to employ variously plasticized polyvinyl resin compositions in molding, coating, and calendering operations during which the processing is carried out at elevated temperatures. During such processing, it often happens that the resins become discolored, the same as occurs when the resin is exposed to light ageing. Furthermore, with such discoloration, acids may also be liberated which, in the case of fabric backings used in waterproof or decorated coated fabrics, attack the fabric and cause rotting of the fabric.

An object of this invention is to provide certain chemical stabilizers which are compatible with the said resins and to an extent not to produce haziness or milkiness in transparent films of the resins, and also to obviate the said discoloring and rotting tendencies. A further object is to produce a stabilized polyvinyl resin composition which is particularly adaptable for use as a fabric coating having the advantage of a water-white, transparent appearance. Another object is to prepare such compositions which will prevent discoloration for longer periods than any of the well-known stabilizers, especially in the presence of sunlight. Another object is to prepare articles from clear, transparent suitable vinyl resins. Other objects will be apparent from the hereinafter description.

According to the invention, there is incorporated with the vinyl resin, as a stabilizer, a small amount of penta alkali-metal pentaalkyl tripolyphosphates having the formula $$R_5M_5(P_3O_{10})_2$$

in which M is alkali-metal, particularly sodium; P is phosphorus; O is oxygen; and R is a radical of the empirical formula $C_8H_{17}$ which includes capryl and 2-ethyl hexyl. These penta alkali-metal, penta octyl, and penta capryl, tripolyphosphates, and more especially the penta sodium salts of the same, are commercially available and are usually marketed as pastes of about 70% concentration of the salt; they are also substantially neutral in reaction when dissolved in distilled water, and analyze about 24% $P_2O_5$. These salts are described pp. 516–521 of the October 1942 Chemical Industries, vol. 51, No. 1. Further, the $Na_5R_5(P_3O_{10})_2$ (R=2-ethyl hexyl) and $Na_5R_5(P_3O_{10})_2$ (R=capryl) are available commercially.

These stabilizers may be incorporated directly into the resin polymer composition, as a dispersion in the plasticizer, or separately after the plasticizer has been added to the polymer resin. This is usually done on an ordinary rubber mixing mill or it may be done in an internal mixer such as a Banbury mixer. It is preferred, when preparing these compositions for use as fabric coatings, to add the stabilizer directly to the organic solution of the vinyl resin polymer. Such coating solutions are prepared by dissolving the previously plasticized resin in a suitable solvent, such as methyl ethyl ketone, or the resin, plasticizer, and solvent may be mixed together in a suitable container by means of a mechanical stirrer, and the stabilizer then added and mixed into the solution.

In the following table the coating compositions containing the stabilizer, applied to a fabric, are compared with a control and with compositions containing other known stabilizers such as calcium stearate, lead stearate, and white lead; the parts are by weight. The vinyl resin is a conjoint polymer of vinyl acetate (2–7 parts) and vinyl chloride (98–93 parts). The phthalate plasticizer is added to the resin before dissolving it in the ketone solvent.

Table

| Material | Parts | Original Sample | Discoloration (100 hr. Fadeometer)[1] | Fabric Condition | Discoloration (2½ hrs. at 230° F.) |
|---|---|---|---|---|---|
| Vinyl Resin | 110 | Water white | Very dark brown | Fabric weak, tears easily. | Amber. |
| Di-2-ethyl hexyl phthalate | 77 | | | | |
| Methyl ethyl ketone | 800 | | | | |
| Vinyl Resin | 110 | ----do---------- | No discoloration, slight bleach | Fabric Unchanged | No discoloration, slight bleach. |
| Di-2-ethyl hexyl phthalate | 77 | | | | |
| Stabilizer $Na_5R_5(P_3O_{10})_2$ | 1.1 | | | | |
| Methyl ethyl ketone | 800 | | | | |
| Vinyl Resin | 110 | Cloudy | Light brown | Fabric weak | Medium brown. |
| Di-2-ethyl hexyl phthalate | 77 | | | | |
| Ca Stearate | 1.1 | | | | |
| Methyl ethyl ketone | 800 | | | | |
| Vinyl Resin | 110 | ----do---------- | Medium brown | Fabric unchanged | Do. |
| Di-2-ethyl hexyl phthalate | 77 | | | | |
| Pb stearate | 1.1 | | | | |
| Methyl ethyl ketone | 800 | | | | |
| Vinyl Resin | 110 | ----do---------- | Light yellow | ------do-------- | Light yellow. |
| Di-2-ethyl hexyl phthalate | 77 | | | | |
| White lead | 1.1 | | | | |
| Methyl ethyl ketone | 800 | | | | |

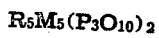
[1] Fadeometer is a

The tests show that without the stabilizer of this invention, discoloration and rotting take place, and that discoloration takes place with the use of the other known stabilizers, even though white lead and lead stearate prevent fabric rotting. Further, that the stabilizers of this invention in the table additionally prevent both discoloration and fabric rotting, and produce a strong, clear film.

In another example, in which the parts are by weight, the vinyl resin (100 parts) is dissolved in a suitable solvent (400 parts) and incorporated with dioctyl phthalate (70 parts) and 2 parts of $Na_5R_5(P_3O_{10})_2$. R is as above defined. In this example Fadeometer and Weatherometer tests (100 hours at 125° F.) show that the penta sodium pentaalkyl phosphate stabilizer is effective in preventing excessive discoloration of polyvinyl chloride resins, and of the conjoint resinous polymers of vinyl chloride and vinylidene chloride, as well as of the resinous copolymers of vinyl chloride and vinyl acetate. It may be stated that after 100 hours of Fadeometer exposure there was a slight yellow discoloration and a slight cloudiness in the Weatherometer samples, but even this is an improvement over the use of the commonly known stabilizers, as referred to, which under similar conditions cause the film to turn brown.

Sodium phosphate is less effective than the pentasodium pentaalkyl tripolyphosphates of the present invention.

The amount of the stabilizer may vary from .5 to about 3% by weight based on 100 parts of the resin, and is usually about 1%.

The stabilizer may be incorporated not only in coating compositions but in molding compositions, and in stocks to be processed in other ways.

The vinyl resin may be of various nature, for example, polyvinyl halide polymers, modified polyvinyl halide polymers, such as the vinyl acetate-vinyl chloride copolymers, and the vinyl chloride-vinylidene chloride copolymers. The stabilizers are especially useful with vinyl resins which are derived at least in part from a vinyl halide such as vinyl chloride, and particularly in which the vinyl polymerizate is a product made by polymerizing a monomeric material consisting essentially of vinyl chloride.

It is to be understood that other plasticizers than those illustrated may be employed for practicing the invention, and that the invention is susceptible to those modifications apparent to those skilled in the art and which appear within the spirit and scope of the appended claims.

Having thus described our invention, what we claim and desire to protect by Letters Patent is:

1. A resinous polymer selected from the group consisting of polyvinyl chloride and copolymers of vinyl chloride and vinyl acetate, stabilized against discoloration and fabric-rotting tendencies upon exposure to light or to elevated temperatures by admixture with from 0.5 to 3% by weight, based on the weight of said polymer, of a penta alkali-metal pentaalkyl tripolyphosphate having the formula $M_5R_5(P_3O_{10})_2$ where R is a $C_8H_{17}$ alkyl radical and M is an alkali-metal, said tripolyphosphate being substantially neutral in reaction when dissolved in distilled water and being compatible with said polymer to such an extent as not to produce haziness or milkiness in transparent films of said polymer.

2. Resinous polyvinyl chloride stabilized against discoloration and fabric-rotting tendencies upon exposure to light or to elevated temperatures by admixture with from 0.5 to 3% by weight, based on the weight of said resinous polyvinyl chloride, of a penta sodium pentaalkyl tripolyphosphate having the formula $Na_5R_5(P_3O_{10})_2$ where R is a $C_8H_{17}$ alkyl radical, said tripolyphosphate being substantially neutral in reaction when dissolved in distilled water and being compatible with said polyvinyl chloride to such an extent as not to produce haziness or milkiness in transparent films of said polyvinyl chloride.

3. A resinous copolymer of vinyl chloride and vinyl acetate stabilized against discoloration and fabric-rotting tendencies upon exposure to light or to elevated temperatures by admixture with from 0.5 to 3% by weight, based on the weight of said resinous copolymer, of a penta sodium pentaalkyl tripolyphosphate having the formula $Na_5R_5(P_3O_{10})_2$ where R is a $C_8H_{17}$ alkyl radical, said tripolyphosphate being substantially neutral in reaction when dissolved in distilled water and being compatible with said copolymer to such an extent as not to produce haziness or milkiness in transparent films of said copolymer.

4. A resinous polymer selected from the group consisting of polyvinyl chloride and copolymers of vinyl chloride and vinyl acetate, stabilized against discoloration and fabric-rotting tendencies upon exposure to light or to elevated temperatures by admixture with from 0.5 to 3% by weight, based on the weight of said polymer, of penta sodium pentaalkyl tripolyphosphate having the formula $Na_5R_5(P_3O_{10})_2$ where R is the 2-ethyl hexyl radical, said tripolyphosphate being substantially neutral in reaction when dissolved in distilled water and being compatible with said polymer to such an extent as not to produce haziness or milkiness in transparent films of said polymer.

5. A plasticized resinous polyymer selected from the group consisting of polyvinyl chloride and copolymers of vinyl chloride and vinyl acetate, stabilized against discoloration and fabric-rotting tendencies upon exposure to light or to elevated temperatures by admixture with from 0.5 to 3% by weight, based on the weight of said polymer, of a penta alkali-metal penta-alkyl tripolyphosphate having the formula $M_5R_5(P_3O_{10})_2$ where R is a $C_8H_{17}$ alkyl radical and M is an alkali-metal, said tripolyphosphate being substantially neutral in reaction when dissolved in distilled water and being compatible with said polymer to such an extent as not to produce haziness or milkiness in transparent films of said polymer.

6. A composition of matter comprising a resinous polymer selected from the group consisting of polyvinyl chloride and copolymers of vinyl chloride and vinyl acetate, di-2-ethyl hexyl phthalate as a plasticizer therefor, and from 0.5 to 3% by weight, based on the weight of said polymer, of a penta alkali-metal pentaalkyl tripolyphosphate having the formula $M_5R_5(P_3O_{10})_2$ where R is a $C_8H_{17}$ alkyl radical and M is an alkali-metal, as a stabilizer protecting said polymer against discoloration and fabric-rotting tendencies upon exposure to light or to elevated temperatures, said tripolyphosphate being substantially neutral in reaction when dissolved in distilled water and being compatible with said polymer to such an extent as not to produce haziness or milkiness in transparent films of said composition.

7. A composition of matter comprising a resinous copolymer of from 93 to 98 per cent of vinyl chloride and from 7 to 2 per cent of vinyl acetate di-2-ethyl hexyl phthalate as a plasticizer therefor, and from 0.5 to 3% by weight, based on the weight of said copolymer, of a penta alkali-metal pentaalkyl tripolyphosphate having the formula $M_5R_5(P_3O_{10})_2$ where R is a $C_8H_{17}$ alkyl radical and M is an alkali-metal, as a stabilizer protecting said copolymer against discoloration and fabric-rotting tendencies upon exposure to light or to elevated temperatures, said tripolyphosphate being substantially neutral in reaction when dissolved in distilled water and being compatible with said copolymer to such an extent as not to produce haziness or milkiness in transparent films of said composition.

8. A composition comprising 100 parts of a resinous copolymer of from 93 to 98 per cent of vinyl chloride and from 7 to 2 per cent of vinyl acetate, 70 parts of di-2-ethyl hexyl phthalate, and 1 part of a penta alkali-metal pentaalkyl tripolyphosphate having the formula $M_5R_5(P_3O_{10})_2$ where R is a $C_8H_{17}$ alkyl radical and M is an alkali-metal, as a stabilizer protecting said copolymer against discoloration and fabric-rotting tendencies upon exposure to light or to elevated temperatures, said tripolyphosphate being substantially neutral in reaction when dissolved in distilled water and being compatible with said polymer to such an extent as not to produce haziness or milkiness in transparent films of said composition.

CURTIS E. HUFF.
GILBERT A. ZIMMERMAN.

REFERENCES CITED

The following references are of record in the file of this patent:

UNITED STATES PATENTS

| Number | Name | Date |
| --- | --- | --- |
| 2,218,645 | Japs | Oct. 22, 1940 |
| 2,337,424 | Stoner | Dec. 21, 1943 |
| 2,364,410 | Whittaker | Dec. 5, 1944 |
| 2,365,400 | Fikentscher | Dec. 19, 1944 |

OTHER REFERENCES

Chemical Industries, vol. 51, pp. 516–521 and 557 (October 1942).